United States Patent
Lin et al.

(10) Patent No.: US 9,883,278 B1
(45) Date of Patent: Jan. 30, 2018

(54) SYSTEM AND METHOD FOR DETECTING EAR LOCATION OF EARPHONE AND RECHANNELING CONNECTIONS ACCORDINGLY AND EARPHONE USING SAME

(71) Applicant: NANNING FUGUI PRECISION INDUSTRIAL CO., LTD., Nanning (CN)

(72) Inventors: Yen-Hsin Lin, New Taipei (TW); Chen-Chi Fan, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 15/490,483

(22) Filed: Apr. 18, 2017

(51) Int. Cl.
| | |
|---|---|
| H04R 1/10 | (2006.01) |
| G06F 3/041 | (2006.01) |
| H04R 5/033 | (2006.01) |
| H04R 5/04 | (2006.01) |
| H04R 29/00 | (2006.01) |

(52) U.S. Cl.
CPC .......... H04R 1/1041 (2013.01); G06F 3/041 (2013.01); H04R 1/1016 (2013.01); H04R 5/033 (2013.01); H04R 5/04 (2013.01); H04R 29/001 (2013.01); H04R 2420/07 (2013.01)

(58) Field of Classification Search
CPC .... H04R 1/1041; H04R 1/1016; H04R 5/033; H04R 5/04; H04R 29/001; H04R 2420/07; G06F 3/041
USPC ..................................................... 381/74, 309
See application file for complete search history.

(56) References Cited

U.S. PATENT DOCUMENTS

| | | | | |
|---|---|---|---|---|
| 2011/0144779 | A1* | 6/2011 | Janse ............... | G11B 20/10009 700/94 |
| 2012/0114154 | A1* | 5/2012 | Abrahamsson ........ | H04R 5/033 381/309 |
| 2013/0279724 | A1* | 10/2013 | Stafford ............... | H04R 1/1041 381/309 |
| 2016/0205475 | A1* | 7/2016 | Shanmugam .......... | H04R 5/033 381/309 |
| 2017/0150269 | A1* | 5/2017 | Li ........................... | H04R 5/04 |

* cited by examiner

*Primary Examiner* — David Ton
(74) *Attorney, Agent, or Firm* — ScienBiziP, P.C.

(57) ABSTRACT

An earphone able to function as a left or as a right earphone and receive sound channels accordingly comprises a processing unit, a capturing unit, and a touch sensor. The capturing unit gets images of ear canal. The touch sensor senses a first and second ear contact points. The processing unit applies sensor readings and captured images to an imaginary circle having a default radius, to determine whether earphone is being worn in the right or in the left ear. The output of sound can be channeled appropriately to an earphone in the left ear or in the right ear or both. A method and a system for detecting wearing state are also provided.

22 Claims, 11 Drawing Sheets

SYSTEM AND METHOD FOR DETECTING EAR LOCATION OF EARPHONE AND RECHANNELING CONNECTIONS ACCORDINGLY AND EARPHONE USING SAME

FIELD

The subject matter herein generally relates to systems and methods for detecting wearing state of earphone and earphones using the same.

BACKGROUND

Earphones are usually stereophonic. If a user wears the earphone on an opposite ear, a sound field that the user hears will be opposite. In order to identify left and right channels of the earphone, the earphone is generally marked L or R to identify the left or right channels. User often cannot see L or R logo under environment with low lighting, it is likely earphones are worn in reverse.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 1:
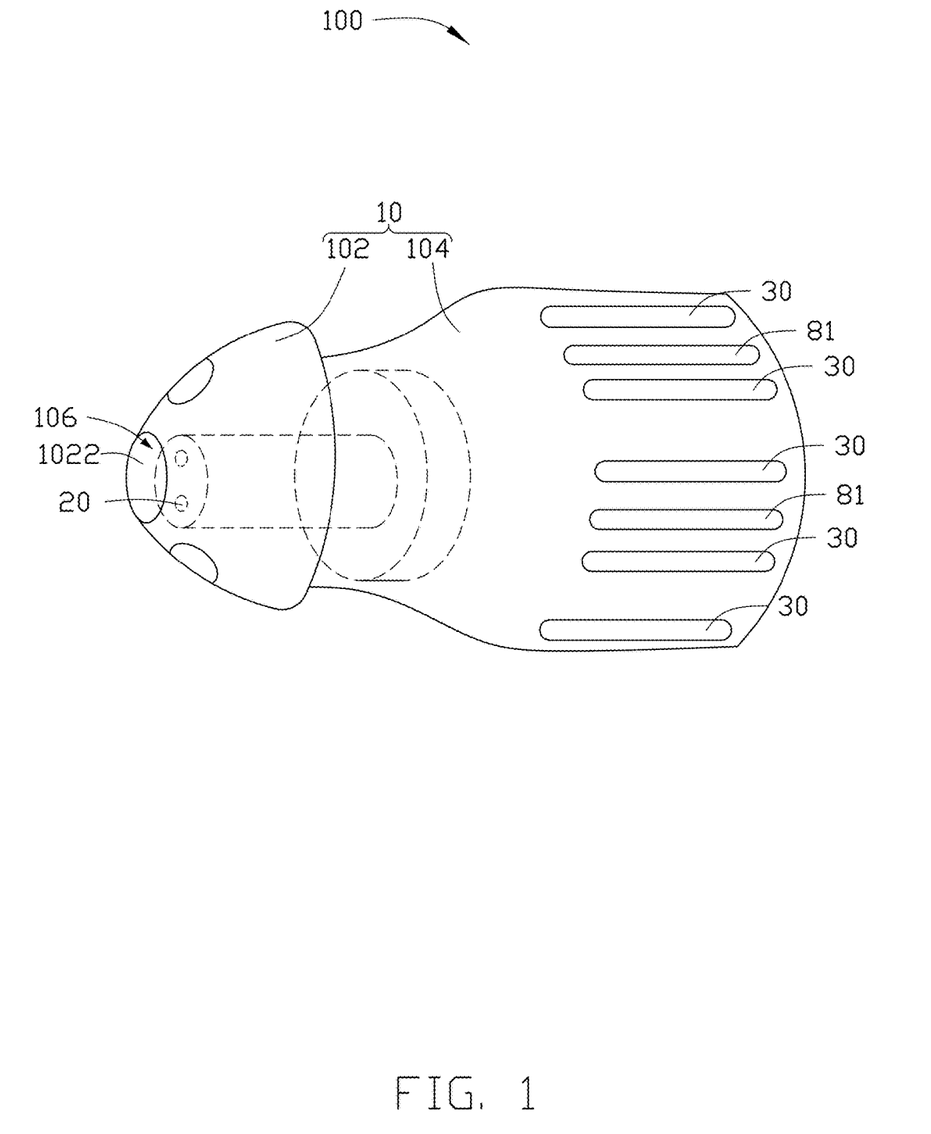
FIG. 1 is a structural diagram of an exemplary embodiment of an earphone.

FIG. 1 shows an exemplary embodiment of an earphone 100. The earphone 100 can include a shell 10. In this exemplary embodiment, the shell 10 can include a front shell 102 and a back shell 104. A receiving space 106 can be cooperatively defined in the front shell 102 and the back shell 104.

Figure 2A:
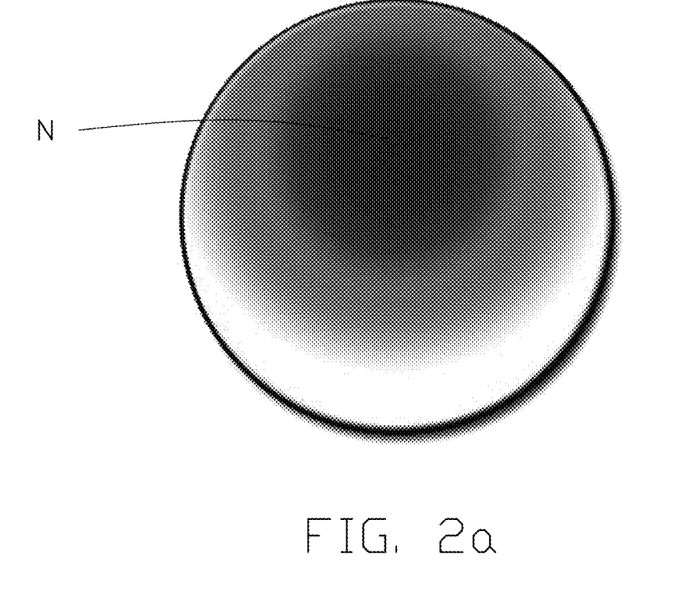
FIGS. 2a and 2b are images of an auditory meatus.
Figure 2B:
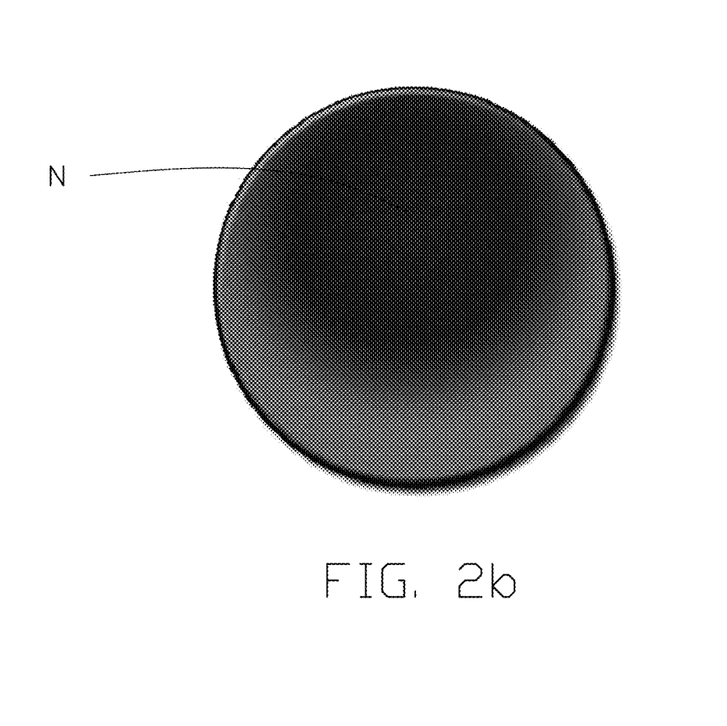

The earphone 100 can further include a capturing unit 20. The capturing unit 20 can be mounted in the receiving space 106 and adjacent to a free end of the front shell 102. The front shell 102 can further define an opening 1022 at the free end of the front shell 102. The opening 1022 and the receiving space 106 are in air communication with each other. The opening 1022 allows the capturing unit 20 to capture images of auditory meatus of an external ear of a user. In this exemplary embodiment, the capturing unit 20 can be a thermal imaging device. The thermal imaging device can be an apparatus for performing photographic imaging according to infrared rays emitted from the auditory meatus of the user. An exemplary auditory meatus image captured by the thermal imaging device is shown on FIG. 2a. In at least one exemplary embodiment, the capturing unit 20 can be green ray camera, but is not limited to the examples provided herein. An exemplary image of auditory meatus captured by the green ray camera is shown on FIG. 2b. The capturing unit 20 can be configured to capture auditory meatus images of the external ear of the user and further obtain an auditory meatus feature point N, for example, from the captured auditory meatus images.

Figure 3:
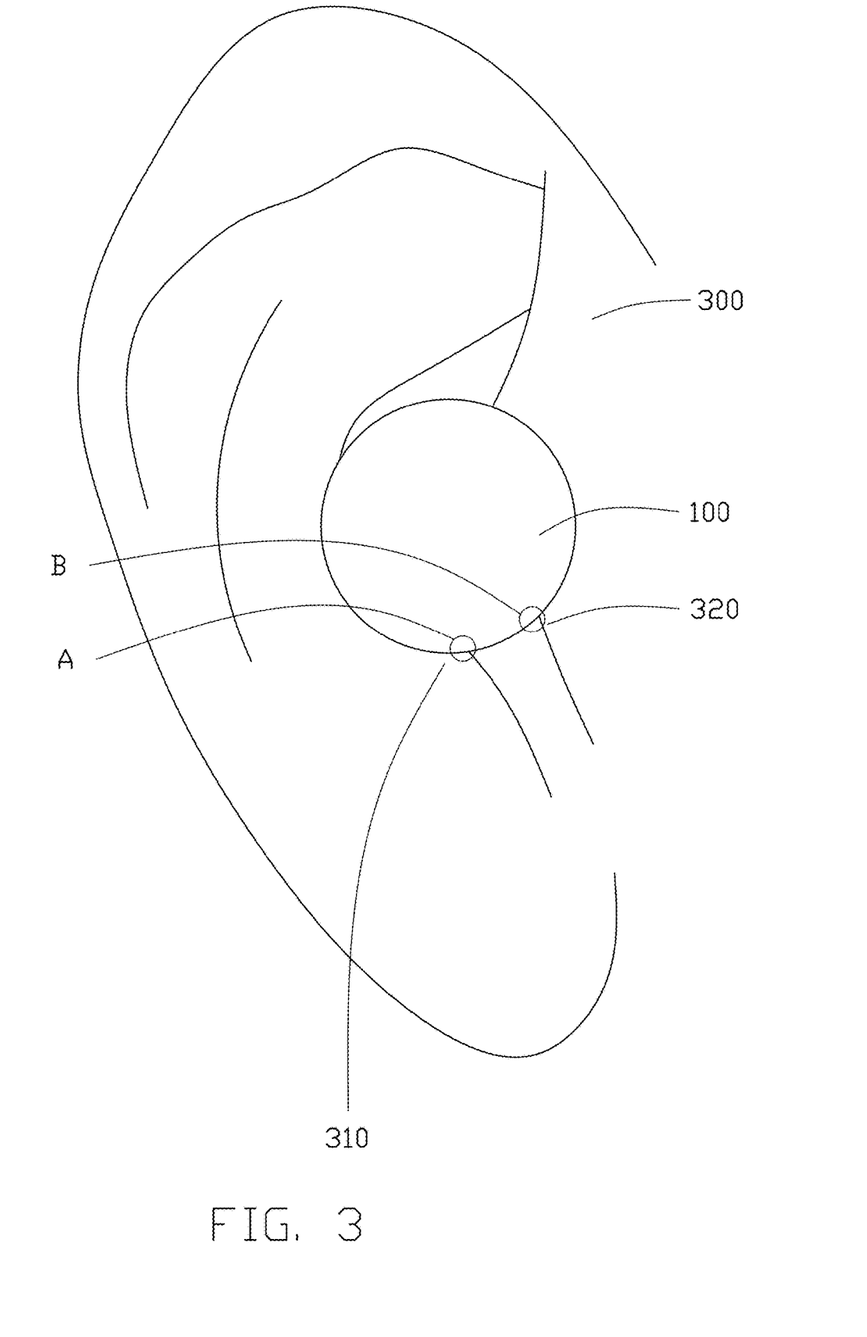
FIG. 3 is a schematic view of the earphone of FIG. 1 being worn on the right ear.

Referring to FIG. 1, the earphone 100 can include a touch sensor 30. The touch sensor 30 can be on an outside surface of the back shell 104. The touch sensor 30 can include a number of touch sensing bars. As shown in FIG. 3, the touch sensor 30 can be configured to touch a first contact point A, which is where the touch sensor 30 contacts an antitragus 310 of an external ear 300 of the user, and a second contact point B, which is where the touch sensor 40 contacts a tragus 320 of the external ear 300 of the user.

Figure 4:
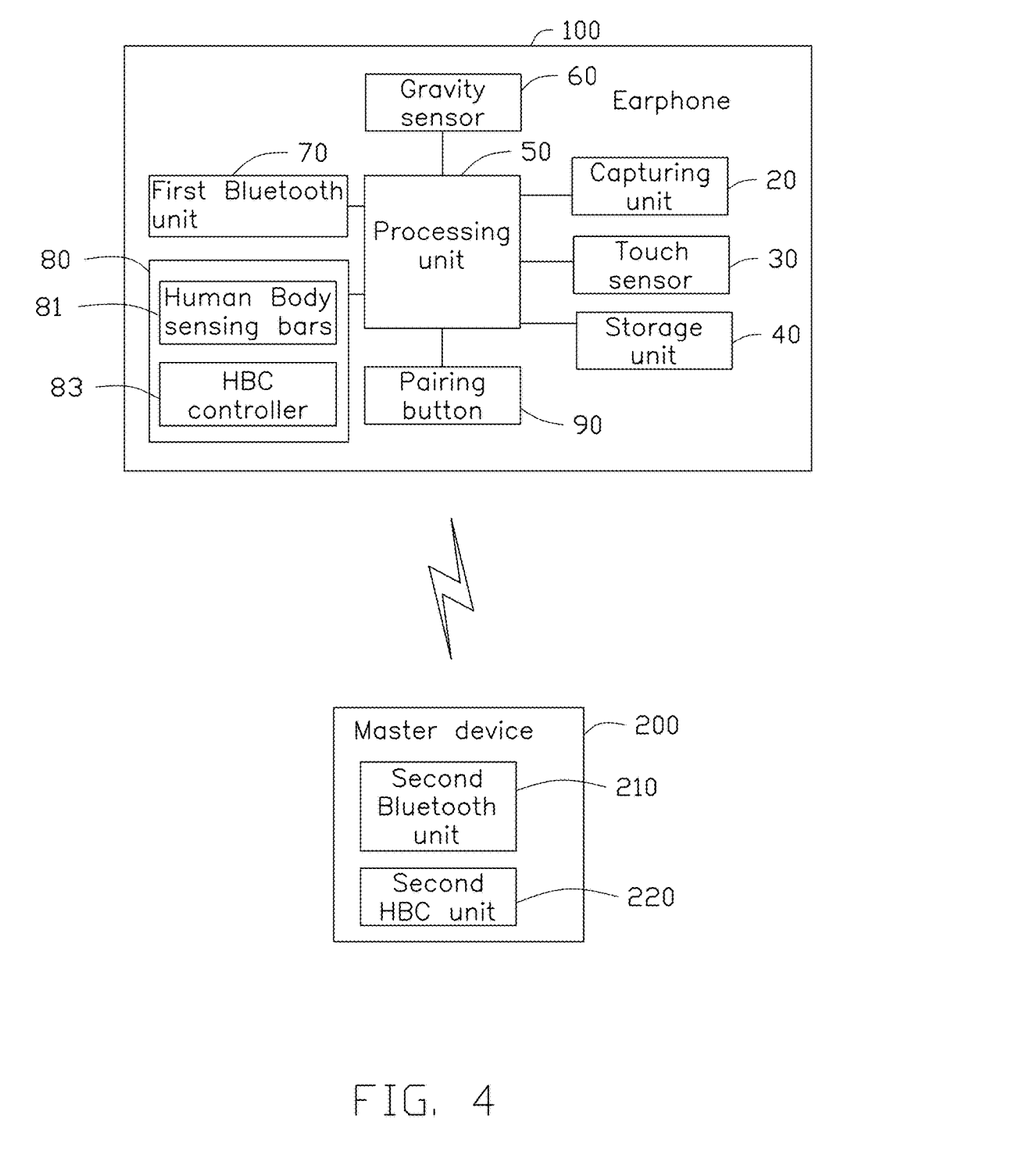
FIG. 4 is a block diagram of the earphone of FIG. 1.

As shown in FIG. 4, the earphone 100 can further include a storage unit 40. The storage unit 40 can be used to store the first contact point A and the second contact point B. The storage unit 40 can be further used to store an imaginary circle, an imaginary ligature, an imaginary radial reference vector, and the like.

In at least one exemplary embodiment, the storage unit 40 can be an internal storage system, such as a flash memory, a random access memory (RAM) for temporary storage of information, and/or a read-memory (ROM) for permanent storage of information.

In at least one exemplary embodiment, the storage unit 40 can also be a storage system, such as a hard disk, a storage card, or a data storage medium. The storage unit 40 can include volatile and/or non-volatile storage devices.

In at least one exemplary embodiment, the storage unit 40 can include two or more storage devices such that one storage device is a memory and the other storage device is a hard drive. Additionally, the storage unit 40 can be either entirely or partially external relative to the earphone 100.

As shown in FIG. 4, the earphone 100 can further include a processing unit 50. The processing unit 50 can be electrically coupled to the capturing unit 20, the touch sensor 30, and the storage unit 40. The processing unit 50 can be a central processing unit, a digital signal processor, or a single chip, for example.

The earphone 100 can further include a gravity sensor 60. The gravity sensor 60 can be received in the receiving space 106 and electrically coupled to the processing unit 50. In this exemplary embodiment, the gravity sensor 60 can be a three axis sensor. The gravity sensor 60 can be configured to sense a gravitational acceleration in direction G of the earphone 100 as shown in FIGS. 6a-6h.

The earphone 100 can further include a BLUETOOTH device (first Bluetooth unit 70). The first Bluetooth unit 70 can be received in the receiving space 106 and further electrically coupled to the processing unit 50. The earphone 100 can be configured to communicate with a master device 200. The master device 200 can include a second Bluetooth unit 210. The first Bluetooth unit 70 can be configured to communicate with the second Bluetooth unit 210 of the master device 200.

The earphone 100 can further include a first Human Body Communication (HBC) unit 80. The first HBC unit 80 can include a number of Human Body sensing bars 81 on the outside surface of the back shell 104 and an HBC controller 83 in the receiving space 106. The HBC controller 83 can be electrically coupled to the Human Body sensing bars 81 and the processing unit 50. The master device 200 can further include a second HBC unit 220. The first HBC unit 80 can communicate with the second HBC unit 220 of the master device 200.

The earphone 100 can further include a pairing button 90. The pairing button 90 can be electrically coupled to the processing unit 50.

In at least one exemplary embodiment, the earphone 100 can further include a number of electrical components for other functions, the details are omitted for simplification.

Figure 5:
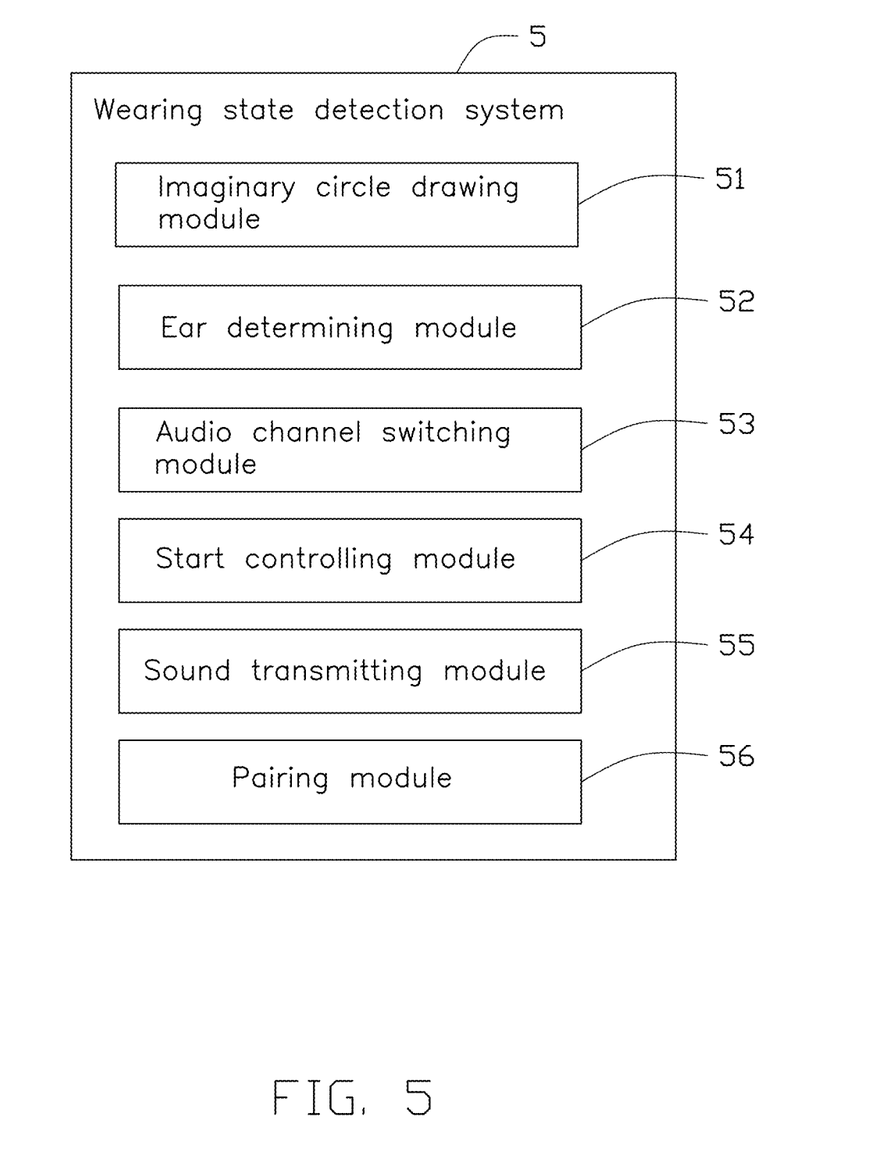
FIG. 5 is a block diagram of a system for detecting wearing states of the earphone of FIG. 1.

FIG. 5 shows a wearing state detection system 5. The wearing state detection system 5 can include a plurality of modules. The plurality of modules can include an imaginary circle drawing module 51, an ear determining module 52, an audio channel switching module 53, a start controlling module 54, a sound transmitting module 55, and a pairing module 56. The imaginary circle drawing module 51, the ear determining module 52, the audio channel switching module 53, the start controlling module 54, the sound transmitting module 55, and the pairing module 56 can be stored in the storage unit 40 of the earphone 100, and further applied on the processing unit 50 of the earphone 100. The modules of the wearing state detection system 5 can include separated functionalities represented by hardware or integrated circuits, or as software and hardware combinations, such as a special-purpose processor or a general-purpose processor with special-purpose firmware.

As shown in FIGS. 6a-6h, the imaginary circle drawing module 51 can digitally draw an imaginary circle M in a two-dimensional plane. Therein, the imaginary circle M can have a center O and a default radius. The circumference of the imaginary circle M can be drawn to intersect the first contact point A and the second contact point B. The auditory meatus feature point N can be within the imaginary circle M.

Figure 6A:
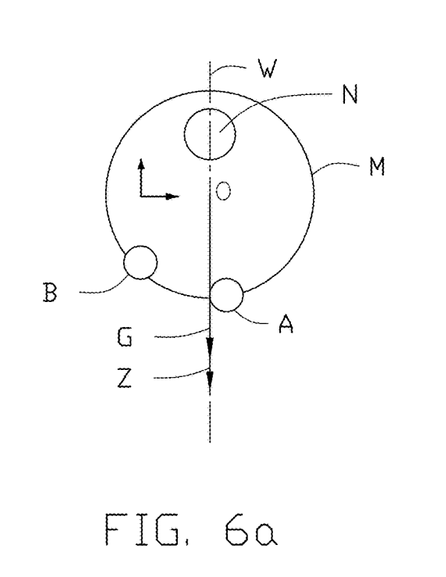
FIG. 6a-6h are schematic diagrams for detecting wearing states of the earphone of FIG. 1.
Figure 6B:
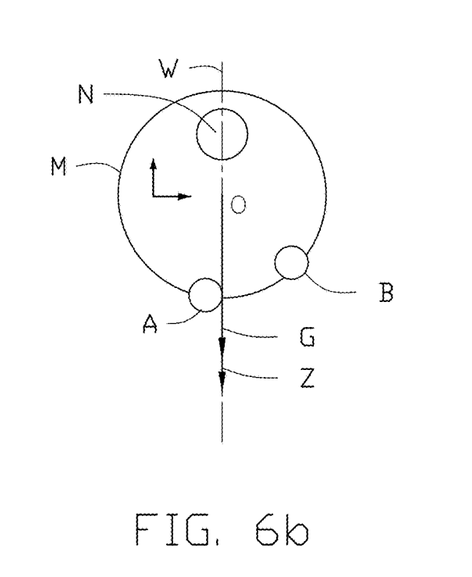

An imaginary line W is defined between the center O and the auditory meatus feature point N. The ear determining module 52 can be configured to rotate the imaginary circle M together with the first contact point A, the second contact point B, and the auditory meatus feature point N about the center O until the auditory meatus feature point N is just above the center O. As shown in FIG. 6a, the ear determining module 52 can be further configured to determine that the earphone 100 is worn on the left ear when the auditory meatus feature point N is just above the center O and the second contact point B is on the left side of the imaginary line W. As shown in FIG. 6b, the ear determining module 52 can be further configured to determine that the earphone 100 is worn on the right ear when the auditory meatus feature point N is just above the center O and the second contact point B is on the right side of the imaginary line W.

The audio channel switching module 53 can be configured to switch an audio channel to a left channel when the ear determining module 52 determines that an earphone 100 is worn on the left ear. The sound track switching module 53 can be further configured to switch an audio channel to a right channel when the ear determining module 52 determines that an earphone 100 is worn on the right ear.

The imaginary circle M has an imaginary radial reference vector Z. The imaginary radial reference vector Z can be parallel to the gravitational acceleration direction G of the earphone 100 when the earphone 100 is worn by a standing user, as shown in FIGS. 6a-6b. That is, when an angle between the imaginary radial reference vector Z and the gravitational acceleration direction G is 0°, the ear determining module 52 can determine that the user of the earphone 100 is standing, and the auditory meatus feature point N is just above the center O. The ear determining module 52 can further determine whether the earphone 100 is worn on the left ear or the right ear according to the relationship between the second contact point B and the imaginary line W.

Figure 6C:
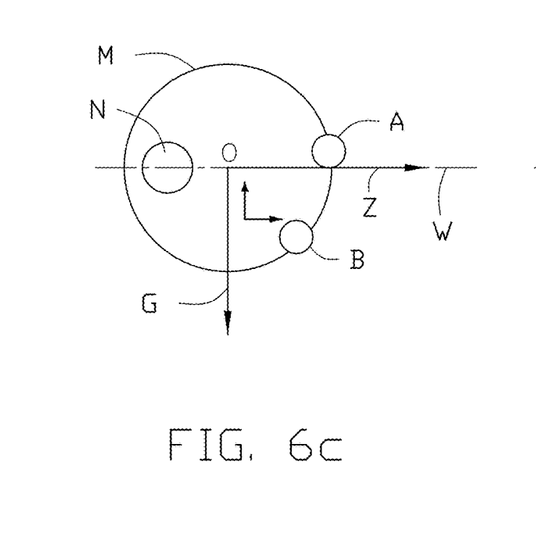
Figure 6D:
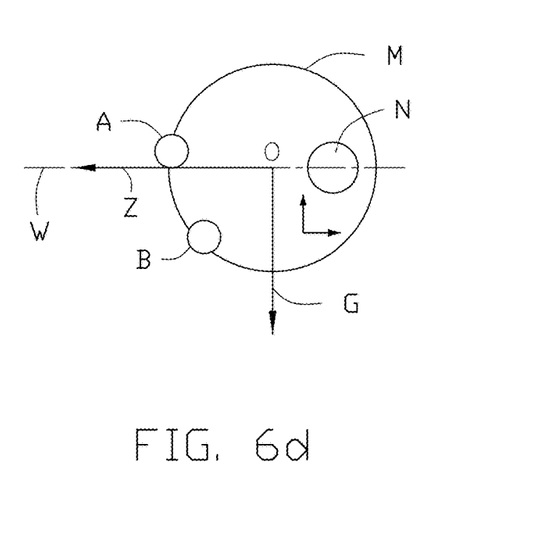

As shown in FIG. 6c, when an angle between the imaginary radial reference vector Z and the gravitational acceleration direction G is 90° and the auditory meatus feature point N is just left side of the center O, the ear determining module 52 can determine that the user of the earphone 100 is lying down and the earphone 100 is worn on the left ear. As shown in FIG. 6d, when an angle between the imaginary radial reference vector Z and the gravitational acceleration direction G is 90° and the auditory meatus feature point N is just right side of the center O, the ear determining module 52 can determine that the user of the earphone 100 is lying down and the earphone 100 is worn on the right ear.

Figure 6E:
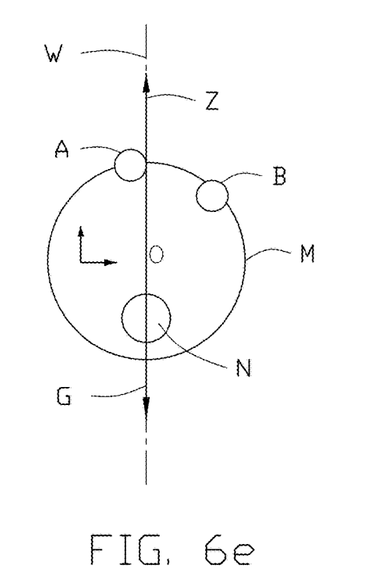
Figure 6F:
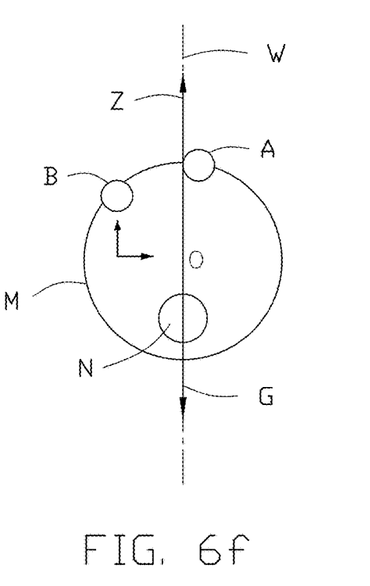

As shown in FIG. 6e, when an angle between the imaginary radial reference vector Z and the gravitational acceleration direction G is 180° and the auditory meatus feature point N is just below the center O, the ear determining module 52 can determine that the user of the earphone 100 is upside down, and the earphone 100 is worn on the left ear, for example, the user is doing yoga exercise in an upside down position having the earphone 100 on the left ear. As shown in FIG. 6f, when an angle between the imaginary radial reference vector Z and the gravitational acceleration direction G is 180° and the auditory meatus feature point N is just below the center O, the ear determining module 52 determines that the user of the earphone 100 is upside down, and the earphone 100 is worn on the right ear.

Figure 6G:
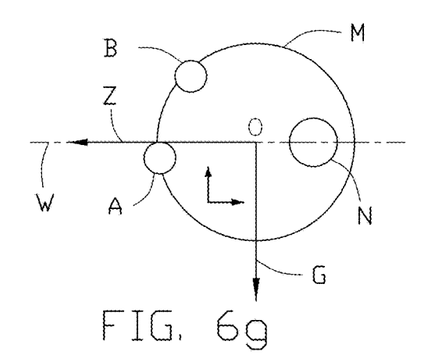
Figure 6H:
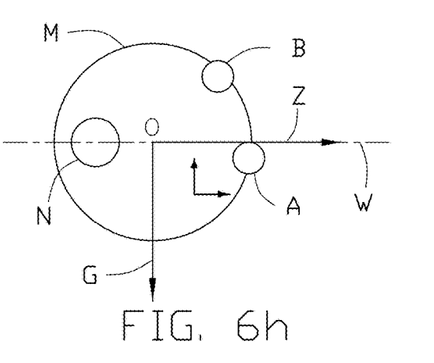

As shown in FIG. 6g, when an angle between the imaginary radial reference vector Z and the gravitational acceleration direction G is 270°, and the auditory meatus feature point N is right side of the center O, the ear determining module 52 determines that the user of the earphone 100 is prostrate, and the earphone 100 is being worn on the left ear. As shown in FIG. 6h, when an angle between the imaginary radial reference vector Z and the gravitational acceleration direction G is 270°, and the auditory meatus feature point N is left side of the center O, the ear determining module 52 determines that the user of the earphone 100 is prostrate, and the earphone 100 is worn on the right ear.

In this exemplary embodiment, as shown in FIG. 6a, the ear determining module 52 determines that the earphone 100 is worn on the left ear under certain conditions (left ear conditions). The left ear conditions are when the angle between the imaginary radial reference vector Z and the gravitational acceleration direction G is 0°, the second contact point B is on the left side of the imaginary line W, and the first contact point A is on the right side of the imaginary line W. As shown in FIG. 6b, the ear determining module 52 determines that the earphone 100 is worn on the right ear when certain conditions (right ear conditions) are met. The right ear conditions are when the angle between the imaginary radial reference vector Z and the gravitational acceleration direction G is 0°, the second contact point B is on the right side of the imaginary line W, and the first contact point A is on the left side of the imaginary line W.

In at least one exemplary embodiment, the ear determining module 52 determines that the earphone 100 is worn on the left ear when the angle between the imaginary radial reference vector Z and the gravitational acceleration direction G is 0°, and the second contact point B and the first contact point A are both on the left side of the imaginary line W. The ear determining module 52 determines that the earphone 100 is worn on the right ear when the angle between the imaginary radial reference vector Z and the gravitational acceleration direction G is 0°, and the second contact point B and the first contact point A are both on the right side of the imaginary line W.

The start controlling module 54 can be configured to activate the earphone 100 to output sound when the ear determining module 52 determines that the earphone 100 has been worn on the left ear or on the right ear.

The pairing module 56 can be configured to control the first Bluetooth unit 70 to determine whether the second Bluetooth unit 210 of the master device 200 is in an inquiring state when the pressing button 90 is pressed. Therein, the master device 200 can be but is not limited to being a telephone, a tablet computer, or the like. Therein, the inquiring state is a state where the pressing button of the master device 200 is pressed, and the master device 200 is at the moment waiting for pairing to the earphone 100.

The pairing module 56 can be further configured to control the first Bluetooth unit 70 to pair with the second Bluetooth unit 210 of the master device 200 when it is determined that the master device 210 is in an inquiring state.

The pairing module 56 can be further configured to control the first HBC unit 80 to pair with the second HBC unit 220 of the master device 200 when it is determined that the second Bluetooth unit 210 of the master device 200 is not in an inquiring state.

The pairing module 56 can be configured to control the first Bluetooth unit 70 to determine whether the second Bluetooth unit 210 of the master device 200, which has been paired previously, can be directly coupled with when the pressing button 90 is not pressed. The pairing module 56 can be configured to transmit the wearing state of the earphone 200 to the master device 200 through Service Discovery Protocol when the second Bluetooth unit 210 of the master device 200, which has been paired previously, can be directly coupled with, such that the first Bluetooth unit 70 can be coupled to the second Bluetooth unit 210 of the master device 200 directly.

The pairing module 56 can be further configured to control the first HBC unit 80 to pair with the second HBC unit 220 of the master device 200 when it is determined that a direct coupling of the first Bluetooth unit 70 to the second Bluetooth unit 210 of the master device 200 is not available.

Before the first HBC unit 80 of the earphone 100 pairs with the second HBC unit 220 of the master device 200, the first HBC unit 80 of the earphone 100 first waits and receives a beacon signal transmitted by the second HBC unit 220 of the master device 200. The beacon signal refers to signal sent periodically in the field of communications. When the first HBC unit 80 of the earphone 100 receives the beacon signal transmitted by the second HBC unit 220 of the master device 200, the first HBC unit 80 of the earphone 100 verifies the existence of the second HBC unit 220 of the master device 200. The first HBC unit 80 of the earphone 100 can be then coupled to the second HBC unit 220 of the master device 200. If the first HBC unit 80 of the earphone 100 has not received the beacon signal in a predefined time duration, the pairing module 56 can be further configured to control the first HBC unit 80 of the earphone 100 to transmit a wake up signal to the second HBC unit 220 of the master device 200. The second HBC unit 220 of the master device 200 transmits a beacon signal to the first HBC unit 80 of the earphone 100 when the second HBC unit 220 of the master device 200 receives the wake up signal. In order to save electricity, when there is no signal needed to be transmitted by the second HBC unit 220 of the master device 200, the transmitting function of the second HBC unit 220 can be closed, and the receiving function of the second HBC unit 220 can be kept open. If the first HBC unit 80 of the earphone 100 has not received the beacon signal in a predefined time duration after transmitting the wake up signal, a new wake up signal can be transmitted again by the first HBC unit 80 of the earphone 100. The predefined time duration can be extended until a beacon signal transmitted by the second HBC unit 220 of the master device 200 is received.

When the first HBC unit 80 of the earphone 100 receives the beacon signal, the pairing module 56 can be further configured to control the earphone 100 to synchronize time with the master device 200. The pairing module 56 can be further configured to control the first HBC unit 80 of the earphone 100 to obtain the available time slot from the beacon signal, and further transmit a connection request through the time slot to the second HBC unit 220 of the master device 200.

The second HBC unit 220 of the master device 200 can confirm the connection request, and can assign a time slot to the first HBC unit 80 of the earphone 100 for sound transmitting.

The sound transmitting module 55 can be configured to select one of the first Bluetooth unit 70 and the first HBC unit 80 to transmit sound data. The transmission rate of the first HBC unit 80 is different for different users as different users have different body capacity effects.

The sound transmitting module 55 can be configured to control the first Bluetooth unit 70 to transmit the sound data when the transmission rate of the first HBC unit 80 is less than a predefined value.

The sound transmitting module 55 can be configured to control the first HBC unit 80 to transmit the sound data when the transmission rate of the first HBC unit 80 is greater than the predefined value.

Figure 7:
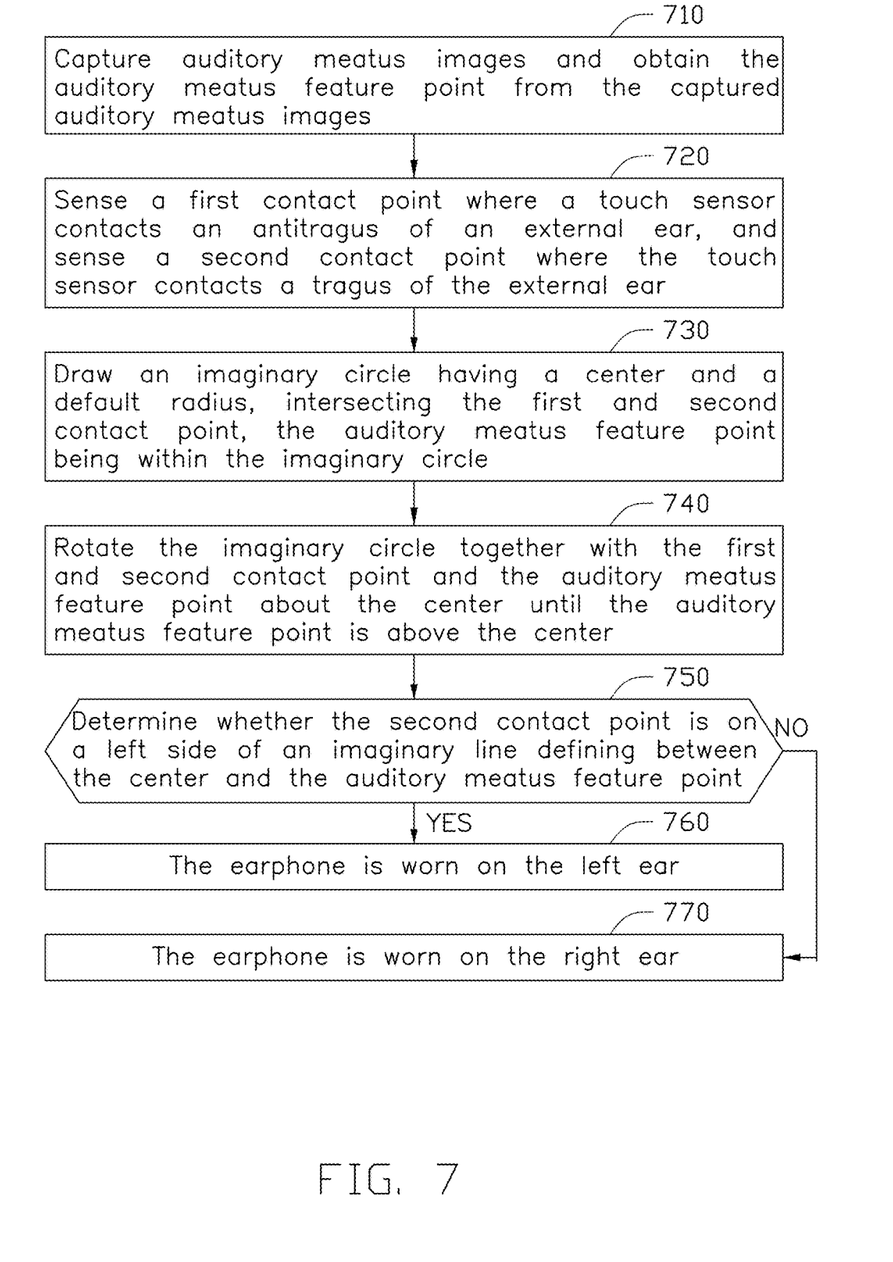
FIG. 7 is a flowchart of a first method for detecting wearing states of the earphone of FIG. 1.

FIG. 7 illustrate a flowchart of a wearing state detection method. The wearing state detection method is provided by way of example, as there are a variety of ways to carry out the method. The wearing state detection method described below can be carried out using the configurations illustrated in FIG. 5, for example, and various elements of these figures are referenced in explaining the example method. Each block shown in FIG. 7 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 710.

At block 710, the auditory meatus images of the external ear 300 of the user are captured and the auditory meatus feature point N is further obtain from the captured auditory meatus images. In this exemplary embodiment, the capturing unit 20 can be a thermal imaging devices. The thermal imaging device can be an apparatus for performing photographic imaging according to infrared rays emitted from an aimed object. In at least one exemplary embodiment, the capturing unit 20 can be green ray camera.

At block 720, the first contact point A, which is where the touch sensor 30 contacts the antitragus 310 of the external ear 300 is sensed, and the second contact point B, which is where the touch sensor 40 contacts the tragus 320 of the external ear 300 is sensed. In this exemplary embodiment, the touch sensor 30 can be on an outside surface of the back shell 104, and can touch a first contact point A, which is where the touch sensor 30 contacts the antitragus 310 of the external ear 300, and a second contact point B, which is where the touch sensor 40 contacts the tragus 320 of the external ear 300.

At block 730, the imaginary circle M is drawn in the two-dimensional plane. Therein, the imaginary circle M has a center O and a default radius. The circumference of the imaginary circle M intersects the first contact point A and the second contact point B. The auditory meatus feature point N is within the imaginary circle M.

At block 740, the imaginary circle M together with the first contact point A, the second contact point B and the auditory meatus feature point N is rotated about the center O, until the auditory meatus feature point N is just above the center O.

At block 750, an imaginary line W between the center O and the auditory meatus feature point N is defined. Determine whether the second contact point B is on the left side of the imaginary line W, if yes, the process goes to block 760, otherwise, the process goes to block 770.

At block 760, it is determined that the earphone 100 is worn on the left ear.

At block 770, it is determined that the earphone 100 is worn on the right ear.

Figure 8:
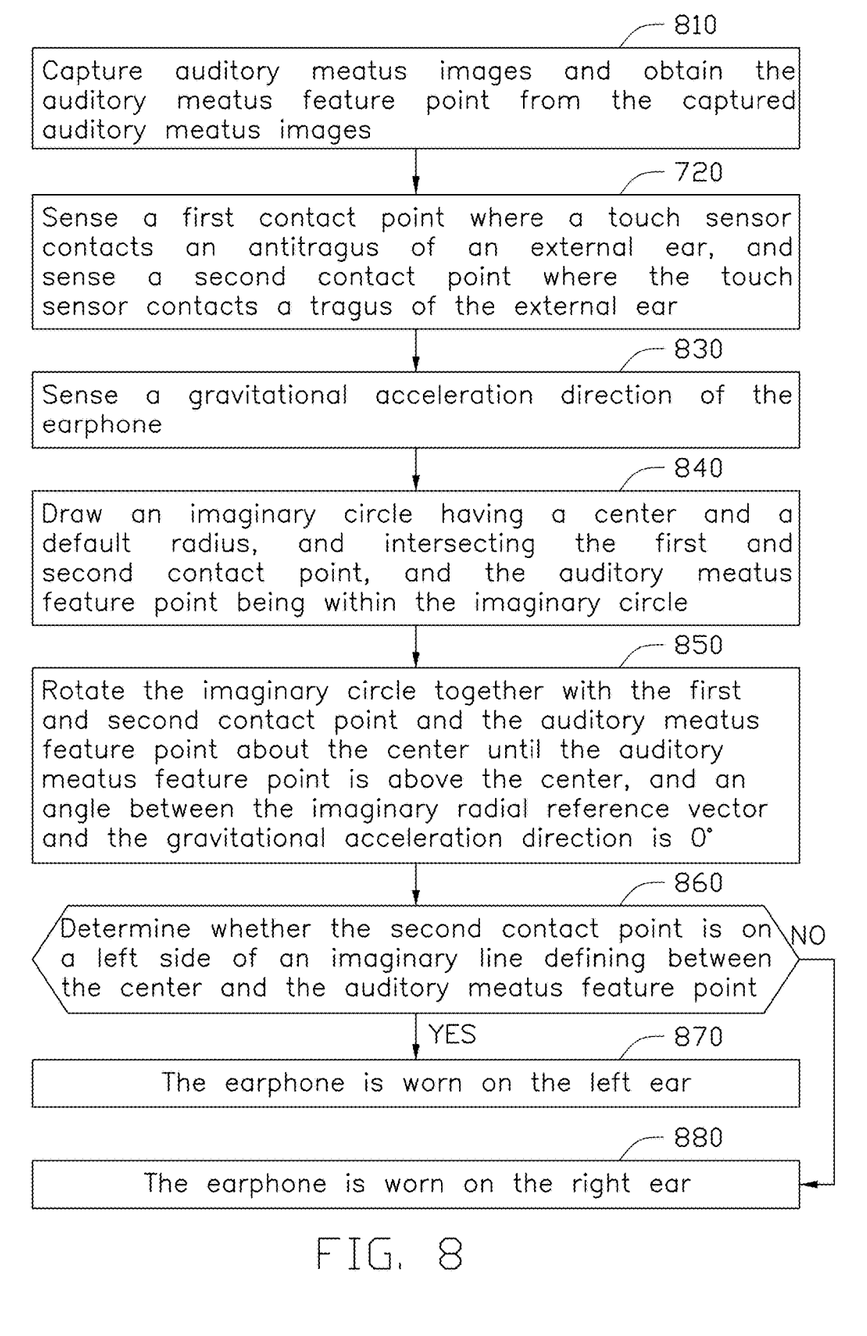
FIG. 8 is a flowchart of a second method for detecting wearing states of the earphone of FIG. 1.

FIG. 8 illustrates a flowchart of a wearing state detection method. The wearing state detection method is provided by way of example, as there are a variety of ways to carry out the method. The wearing state detection method described below can be carried out using the configurations illustrated in FIG. 5, for example, and various elements of these figures are referenced in explaining the example method. Each block shown in FIG. 8 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 810.

At block 810, the auditory meatus images are captured and the auditory meatus feature point N is further obtain from the captured auditory meatus images. In this exemplary embodiment, the capturing unit 20 can be a thermal imaging device. The thermal imaging device can be an apparatus for performing photographic imaging according to infrared rays emitted from an aimed object. In at least one exemplary embodiment, the capturing unit 20 can be green ray camera.

At block 820, the first contact point A, which is where the touch sensor 30 contacts the antitragus 310 of the external ear 300 is sensed, and the second contact point B, which is where the touch sensor 40 contacts the tragus 320 of the external ear 300 is sensed. In this exemplary embodiment, the touch sensor 30 on an outside surface of the back shell 104 can touch a first contact point A, which is where the touch sensor 30 contacts the antitragus 310 of the external ear 300, and a second contact point B, which is where the touch sensor 40 contacts the tragus 320 of the external ear 300.

At block 830, the gravitational acceleration direction G of the earphone 100 is sensed. In this exemplary embodiment, the gravity sensor 60 in the earphone 100 can sense the gravitational acceleration direction G of the earphone 100.

At block 840, the imaginary circle M is drawn in the two-dimensional plane according to the auditory meatus feature point N, the first contact point A and the second contact point B. Therein, the imaginary circle M has a center O and a default radius. The circumference of the imaginary circle M intersects the first contact point A and the second contact point B. The auditory meatus feature point N is within the imaginary circle M.

At block 850, the imaginary circle M together with the first contact point A, the second contact point B and the auditory meatus feature point N are rotated about the center O, until the auditory meatus feature point N is just above the center O, and the angle between the imaginary radial reference vector Z and the gravitational acceleration direction G is 0°.

At block 860, an imaginary line W between the center O and the auditory meatus feature point N is defined. Determine whether the second contact point B is on the left side of the imaginary line W, if yes, the process goes to block 870, otherwise, the process goes to block 880.

In at least one exemplary embodiment, determine whether the first contact point A and the second contact point B are both on the left side of the imaginary line W, if yes, the process goes to block 870, otherwise, the process goes to block 880.

At block 870, it is determined that the earphone 100 is worn on the left ear.

At block 880, it is determined that the earphone 100 is worn on the right ear.

Figure 9:
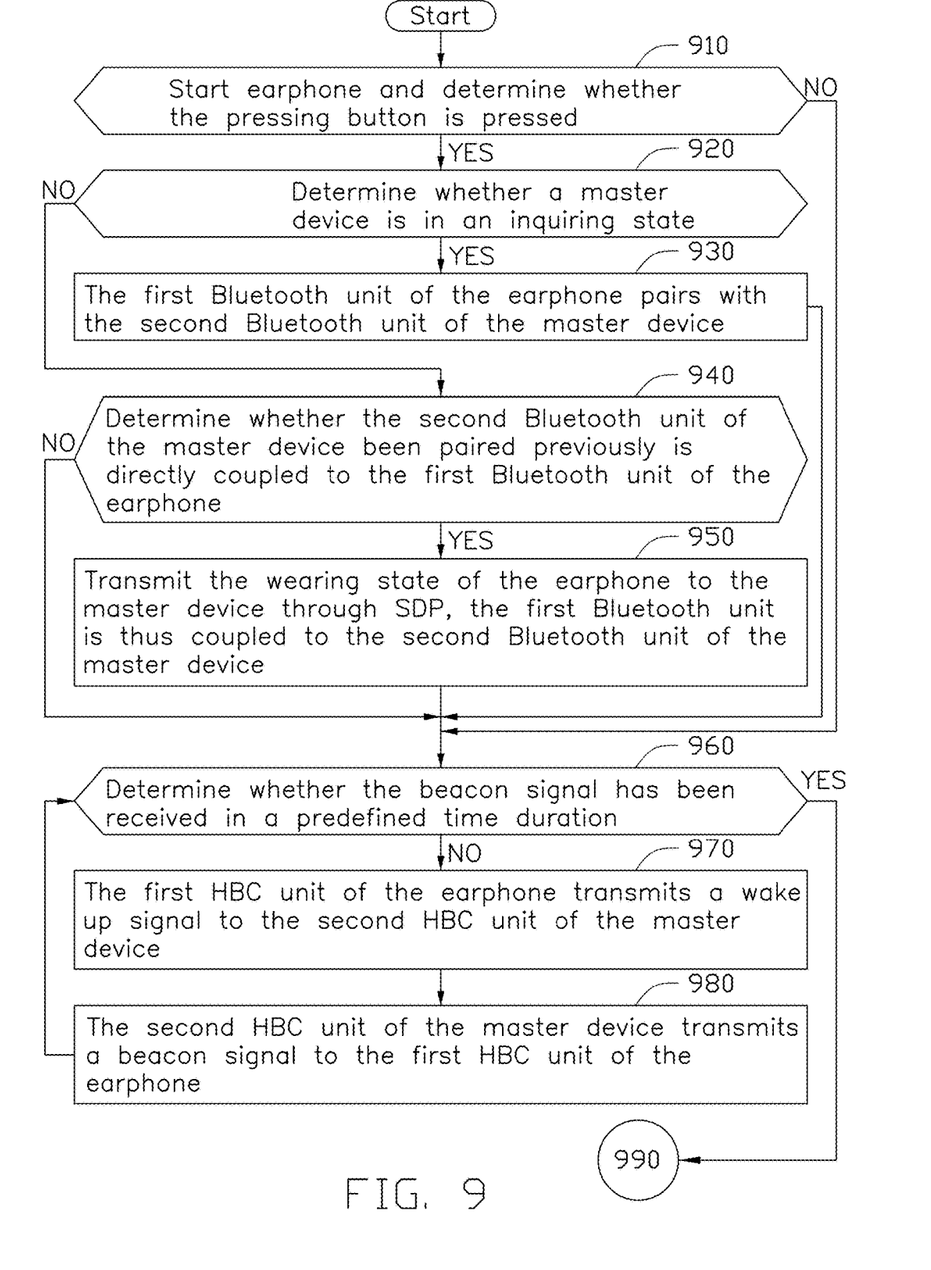
FIGS. 9 and 10 cooperatively constitute a single flowchart of a pairing method for the earphone pairing with a master device.
Figure 10:
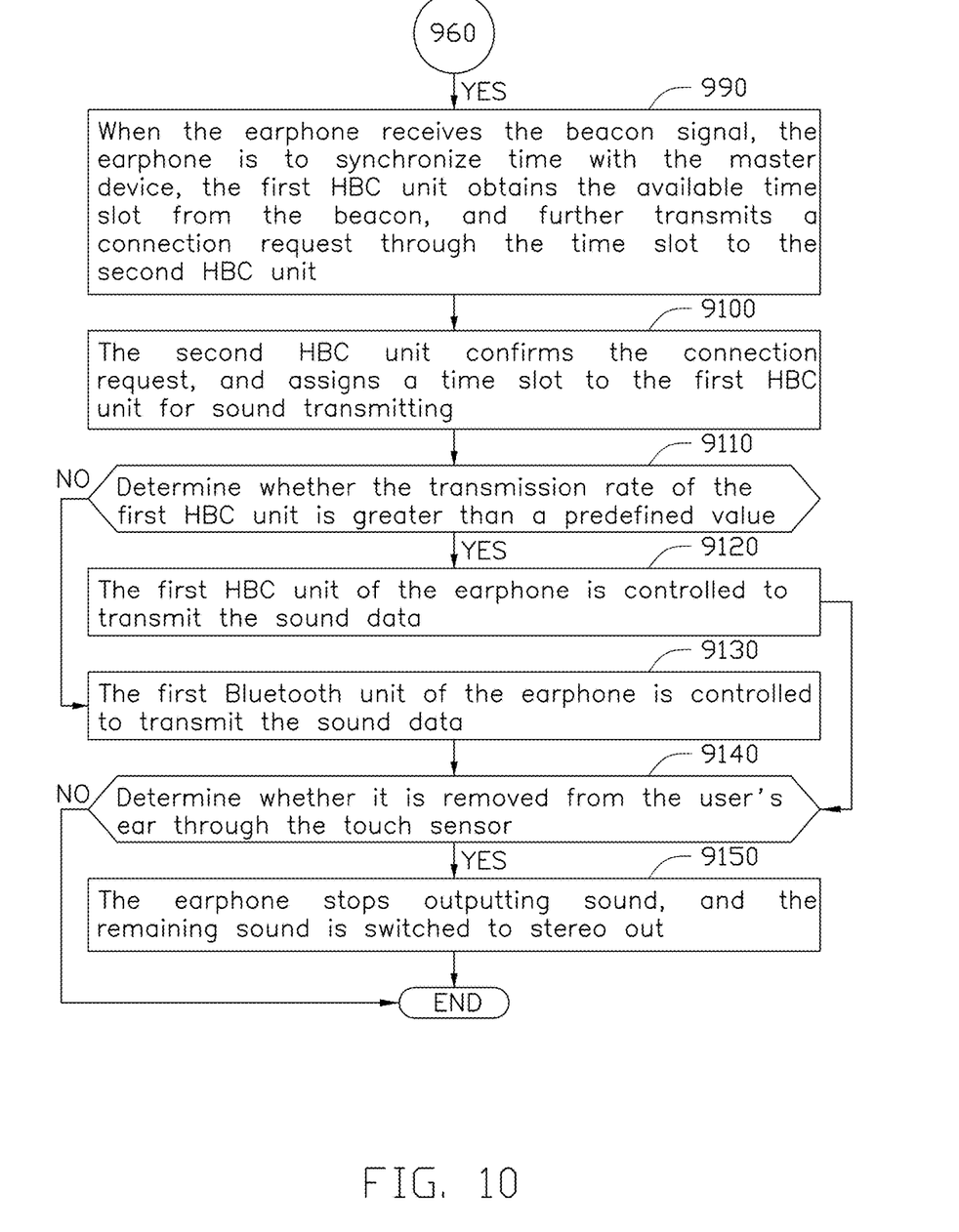

FIGS. 9 and 10 cooperatively constitute a signal flowchart of a pairing method applied on the earphone 100. The pairing method is provided by way of example, as there are a variety of ways to carry out the method. The pairing method described below can be carried out using the configurations illustrated in FIG. 5, for example, and various elements of these figures are referenced in explaining the example method. Each block shown in FIGS. 9 and 10 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 910.

At block 910, the earphone 100 is activated when the earphone 100 to output sound has been worn on the left ear or on the right ear, and determine whether the pressing button 90 is pressed, if yes, the process goes to block 920, otherwise, the process goes to block 960.

At block 920, the second Bluetooth unit 210 of the master device 200 is determined whether to be in an inquiring state. If yes, the process goes to block 930, otherwise, the process goes to block 940.

At block 930, the first Bluetooth unit 70 of the earphone 100 is controlled to pair with the second Bluetooth unit 210 of the master device 200, and the process goes to block 960.

At block 940, the first Bluetooth unit 70 of the earphone 100 is controlled to determine whether the second Bluetooth unit 210 of the master device 200, which had been paired previously, can be directly coupled with. If yes, the process goes to block 950, otherwise, the process goes to block 960.

At block 950, the wearing state of the earphone 200 is transmitted to the master device 200 through Service Discovery Protocol, such that the first Bluetooth unit 70 is coupled to the second Bluetooth unit 210 of the master device 200 directly, and then the process goes to block 960.

At block 960, the first HBC unit 80 of the earphone 100 determines whether the beacon signal has been received in a predefined time duration. If yes, the process goes to block 990, otherwise, the process goes to block 970.

At block 970, the first HBC unit 80 of the earphone 100 is controlled to transmit a wake up signal to the second HBC unit 220 of the master device 200.

At block 980, the second HBC unit 220 of the master device 200 transmits a beacon signal to the first HBC unit 80 of the earphone 100, and then the process goes to block 990.

At block 990, when the first HBC unit 80 of the earphone 100 receives the beacon, the earphone 100 is controlled to synchronize time with the master device 200, the first HBC unit 80 of the earphone 100 is controlled to obtain the available time slot from the beacon signal, and to further transmit a connection request through the time slot to the second HBC unit 220 of the master device 200.

At block 9100, the second HBC unit 220 of the master device 200 confirms to the connection request, and assigns a time slot to the first HBC unit 80 of the earphone 100 for sound transmitting.

At block 9110, the transmission rate of the first HBC unit 80 is determined whether to be greater than a predefined value. If yes, the process goes to block 9120, otherwise, the process goes to block 9130.

At block 9120, the first HBC unit 80 is controlled to transmit the sound data.

At block 9130, the first Bluetooth unit 70 of the earphone 100 is controlled to transmit the sound data.

At block 9140, the earphone 100 is determined whether to be removed from the user's ear through the touch sensor 40. If yes, the process goes to block 9150, otherwise, the process continues to block 9140.

At block 9150, the earphone 100 is controlled to stop outputting sound, and the remaining sound is switched to stereo out.

The exemplary embodiments shown and described above are only examples. Many details are often found in the art such as the features of system and method for detecting ear location of earphone and rechanneling connections accordingly and earphone using same. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. An earphone, comprising
a shell;
a processing unit received in the shell;
a capturing unit received in the shell and electrically coupled to the processing unit, the capturing unit capturing auditory meatus images of an external ear of a user and obtaining an auditory meatus feature point from the captured auditory meatus images; and
a touch sensor outside of the shell, the touch sensor touching a first contact point and a second contact point, the first contact point being where the touch sensor contacts an antitragus of the external ear of the user, and the second contact point being where the touch sensor contacts a tragus of the external ear of the user;
wherein the processing unit digitally draws an imaginary circle in a two-dimensional plane, the imaginary circle has a default radius, the imaginary circle intersects the first contact point and the second contact point, and the auditory meatus feature point is within the imaginary circle;
wherein the processing unit rotates the imaginary circle together with the first contact point, the second contact point, and the auditory meatus feature point about a center of the imaginary circle until the auditory meatus feature point is above the center;
wherein when the auditory meatus feature point is above the center and the second contact point is on a left side of an imaginary line defined between the center and the auditory meatus feature point, the processing unit determines that the earphone is worn on a left ear of the user; when the second contact point is on a right side of the imaginary line, the processing unit determines that the earphone is worn on a right ear of the user;
wherein the processing unit switches to a left channel to output sound data when the earphone is worn on the left ear, and switches to a right channel to output the sound data when the earphone is worn on the right ear.

2. The earphone of claim 1, wherein the processing unit determines that the earphone is worn on the left ear of the user when the auditory meatus feature point is above the center, and the first contact point and the second contact point are on the left side of the imaginary line; wherein the processing unit determines that the earphone is worn on the right ear of the user when the auditory meatus feature point is above the center, and the first contact point and the second contact point are on the right side of the imaginary line.

3. The earphone of claim 1, wherein the processing unit determines that the earphone is worn on the left ear of the user when the auditory meatus feature point is above the center, the first contact point is on the right side of the imaginary line, and the second contact point is on the left side of the imaginary line; wherein the processing unit determines that the earphone is worn on the right ear of the user when the auditory meatus feature point is above the center, the first contact point is on the left side of the imaginary line, and the second contact point is on the right side of the imaginary line.

4. The earphone of claim 1, wherein the imaginary circle has an imaginary radial reference vector, the earphone further comprises a gravity sensor received in the shell and electrically coupled to the processing unit, the gravity sensor senses a gravitational acceleration direction of the earphone, the imaginary radial reference vector is parallel to the gravitational acceleration direction of the earphone when the earphone is worn by a standing user, the processing unit determines that the auditory meatus feature point is above the center when an angle between the imaginary radial reference vector and the gravitational acceleration direction is 0° or substantially in front of 1°.

5. The earphone of claim 4, wherein the processing unit determines that the earphone is worn on the left ear of the user when the auditory meatus feature point is above the center, and the first contact point and the second contact point are on the left side of the imaginary line; wherein the processing unit determines that the earphone is worn on the right ear of the user when the auditory meatus feature point is above the center, and the first contact point and the second contact point are on the right side of the imaginary line.

6. The earphone of claim 4, wherein the processing unit determines that the earphone is worn on the left ear of the user when the auditory meatus feature point is above the center, the first contact point is on the right side of the imaginary line, and the second contact point is on the left side of the imaginary line; wherein the processing unit determines that the earphone is worn on the right ear of the user when the auditory meatus feature point is above the center, the first contact point is on the left side of the imaginary line, and the second contact point is on the right side of the imaginary line.

7. The earphone of claim 1, wherein the earphone further comprises:
   a first Bluetooth unit received in the shell and further electrically coupled to the processing unit, the first Bluetooth unit configured to communicate with a second Bluetooth unit of a master device;
   a first Human Body Communication (HBC) unit electrically coupled to the processing unit, the first HBC unit configured to communicate with a second HBC unit of the master device;
   wherein the processing unit selects one of the first Bluetooth unit and the first HBC unit to transmit the sound data.

8. The earphone of claim 7, wherein, the processing unit controls the first Bluetooth unit to transmit the sound data when a transmission rate of the first HBC unit is less than a predefined value, and the processing unit controls the first HBC unit to transmit the sound data when the transmission rate of the first HBC unit is greater than the predefined value.

9. A wearing state detection system for an earphone, comprising
   at least one processing unit; and
   a non-transitory computer readable medium coupled to the at least one processing unit and configured to store instructions for execution by the at least one processing unit, the instructions causing the at least one processing unit to:
      capture auditory meatus images of an external ear of a user and obtaining an auditory meatus feature point from the captured auditory meatus images; and
      detect a first contact point and a second contact point; the first contact point being where the touch sensor contacts an antitragus of the external ear of the user; and the second contact point being where the touch sensor contacts a tragus of the external ear of the user;
      draw an imaginary circle digitally, wherein the imaginary circle has a default radius, the imaginary circle intersects the first contact point and the second contact point, and the auditory meatus feature point is within the imaginary circle;
      rotate the imaginary circle together with the first contact point, the second contact point and the auditory meatus feature point about a center of the imaginary circle until the auditory meatus feature point is just above the center;
      determine that the earphone is worn on a left ear of the user when the auditory meatus feature point is just above the center and the second contact point is on a left side of an imaginary line defining between the center and the auditory meatus feature point;
      determine that the earphone is worn on a right ear of the user when the second contact point is on a right side of the imaginary line;
      switch to a left channel to output sound data when the earphone is worn on the left ear; and
      switch to a right channel to output the sound data when the earphone is worn on the right ear.

10. The system of claim 9, wherein, the instructions cause the at least one processing unit to:
    determine that the earphone is worn on the left ear of the user when the auditory meatus feature point is just above the center, and the first contact point and the second contact point are on the left side of the imaginary line; and
    determine that the earphone is worn on the right ear of the user when the auditory meatus feature point is just above the center, and the first contact point and the second contact point are on the right side of the imaginary line.

11. The system of claim 9, wherein, the instructions cause the at least one processing unit to:
    determine that the earphone is worn on the left ear of the user when the auditory meatus feature point is just above the center, the first contact point is on the right side of the imaginary line, and the second contact point is on the left side of the imaginary line; and
    determine that the earphone is worn on the right ear of the user when the auditory meatus feature point is just above the center, the first contact point is on the left side of the imaginary line, the second contact point is on the right side of the imaginary line.

12. The system of claim 9, wherein, the instructions cause the at least one processing unit to:
    sense a gravitational acceleration direction of the earphone, wherein the imaginary circle has an imaginary radial reference vector, the imaginary radial reference vector is parallel to the gravitational acceleration direction of the earphone when the earphone is worn by a standing user; and
    determine that the auditory meatus feature point is just above the center when an angle between the imaginary radial reference vector and the gravitational acceleration direction is 0°.

13. The system of claim 12, wherein, the instructions cause the at least one processing unit to:

determine that the earphone is worn on the left ear of the user when the auditory meatus feature point is just above the center, and the first contact point and the second contact point are on the left side of the imaginary line; and determine that the earphone is worn on the right ear of the user when the auditory meatus feature point is just above the center, and the first contact point and the second contact point are on the right side of the imaginary line.

14. The system of claim 12, wherein, the instructions cause the at least one processing unit to:

determine that the earphone is worn on the left ear of the user when the auditory meatus feature point is just above the center, the first contact point is on the right side of the imaginary line, and the second contact point is on the left side of the imaginary line; and determine that the earphone is worn on the right ear of the user when the auditory meatus feature point is just above the center, the first contact point is on the left side of the imaginary line, the second contact point is on the right side of the imaginary line.

15. The system of claim 9, wherein, the instructions cause the at least one processing unit to:

select one of a first Bluetooth unit of the earphone and a first Human Body Communication (HBC) unit of the earphone to transmit the sound, wherein the first Bluetooth unit is configured to communicate with a second Bluetooth unit of a master device, and the first HBC unit is configured to communicate with a second HBC unit of the master device.

16. The system of claim 15, wherein, the instructions cause the at least one processing unit to:

control the first Bluetooth unit to transmit the sound data when a transmission rate of the first HBC unit is less than a predefined value; and control the first HBC unit to transmit the sound data when the transmission rate of the first HBC unit is greater than the predefined value.

17. A wearing state detection method for an earphone, comprising capturing auditory meatus images of an external ear of a user and obtaining an auditory meatus feature point from the captured auditory meatus images;

detecting a first contact point and a second contact point; the first contact point being where the touch sensor contacts an antitragus of the external ear of the user; and the second contact point being where the touch sensor contacts a tragus of the external ear of the user;

drawing an imaginary circle digitally, wherein the imaginary circle has a predefined radius, the imaginary circle intersects the first contact point and the second contact point, and the auditory meatus feature point is in the imaginary circle;

rotating the imaginary circle together with the first contact point, the second contact point and the auditory meatus feature point about a center of the imaginary circle until the auditory meatus feature point is just above the center;

determining that the earphone is worn on a left ear of the user when the auditory meatus feature point is just above the center and the second contact point is on a left side of an imaginary line defining between the center and the auditory meatus feature point;

determining that the earphone is worn on a right ear of the user when the second contact point is on a right side of the imaginary line;

switching to a left channel to output sound when the earphone is worn on the left ear; and switching to a right channel to output sound when the earphone is worn on the right ear.

18. The method of claim 17, wherein, the method comprises:

determining that the earphone is worn on the left ear of the user when the auditory meatus feature point is just above the center, and the first contact point and the second contact point are on the left side of the imaginary line; and determining that the earphone is worn on the right ear of the user when the auditory meatus feature point is just above the center, and the first contact point and the second contact point are on the right side of the imaginary line.

19. The method of claim 17, wherein, the method comprises:

determining that the earphone is worn on the left ear of the user when the auditory meatus feature point is just above the center, the first contact point is on the right side of the imaginary line, and the second contact point is on the left side of the imaginary line; and determining that the earphone is worn on the right ear of the user when the auditory meatus feature point is just above the center, the first contact point is on the left side of the imaginary line, and the second contact point is on the right side of the imaginary line.

20. The method of claim 17, wherein, the method comprises:

sensing a gravitational acceleration direction of the earphone, wherein the imaginary circle has an imaginary radial reference vector, the imaginary radial reference vector is parallel to the gravitational acceleration direction of the earphone when the earphone is worn by a standing user; and determining that the auditory meatus feature point is just above the center when an angle between the imaginary radial reference vector and the gravitational acceleration direction is 0°.

21. The method of claim 17, wherein, the method comprises:

selecting one of a first Bluetooth unit of the earphone and a first Human Body Communication (HBC) unit of the earphone to transmit the sound, wherein the first Bluetooth unit is configured to communicate with a second Bluetooth unit of a master device, and the first HBC unit is configured to communicate with a second HBC unit of the master device.

22. The method of claim 21, wherein, the method comprises:

controlling the first Bluetooth unit to transmit the sound data when a transmission rate of the first HBC unit is less than a predefined value; and controlling the first HBC unit to transmit the sound data when the transmission rate of the first HBC unit is greater than the predefined value.

* * * * *